Nov. 4, 1924.
C. KINSLEY
STORAGE BATTERY
Filed Sept. 18, 1920
1,513,913
2 Sheets—Sheet 1
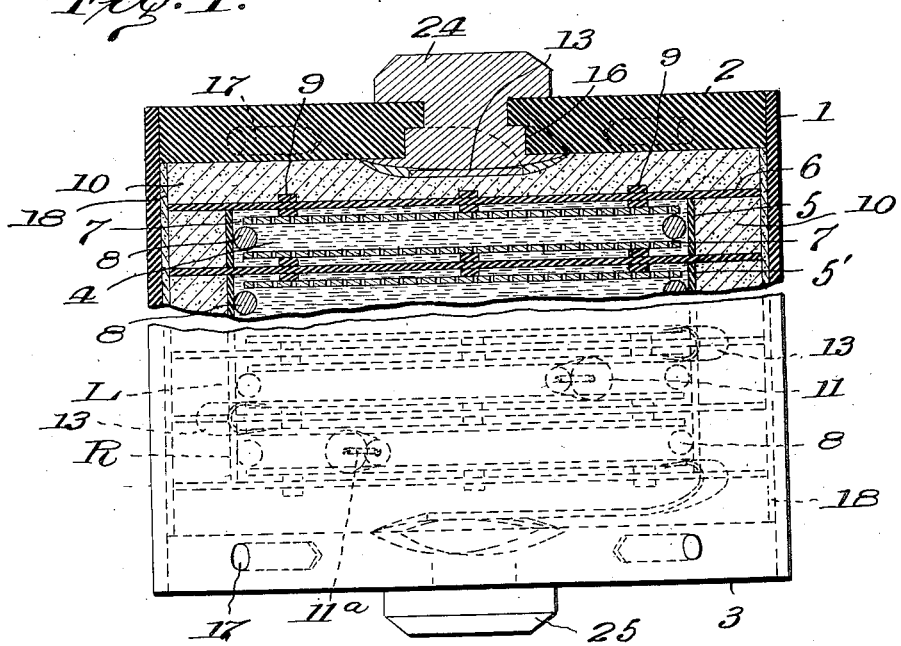
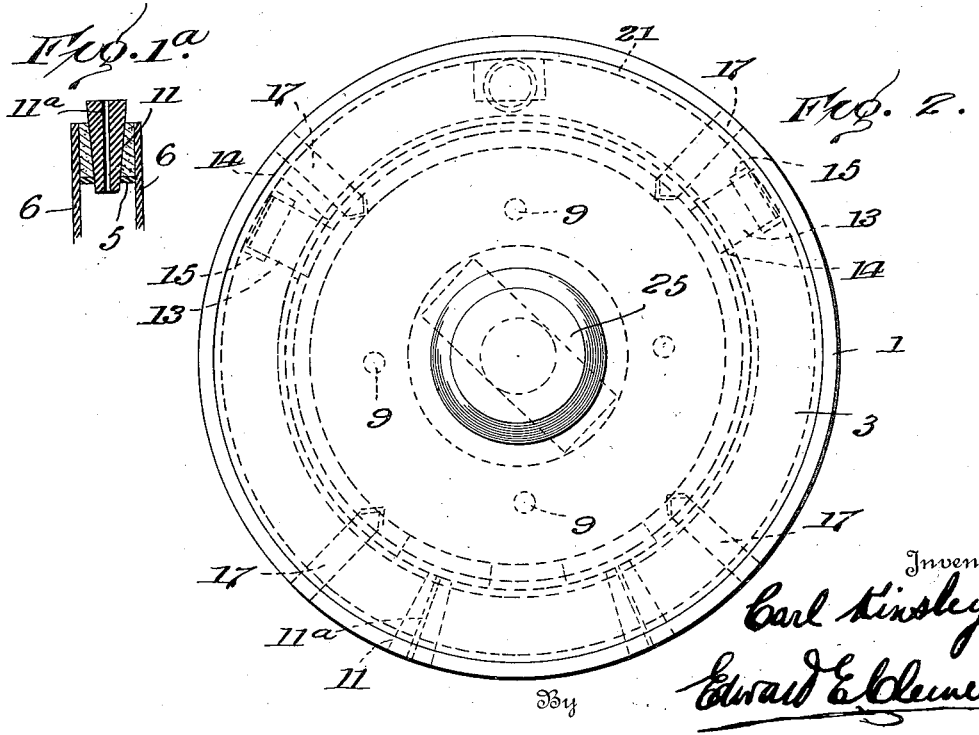
Inventor
Carl Kinsley
By Edward E. Clement
Attorney

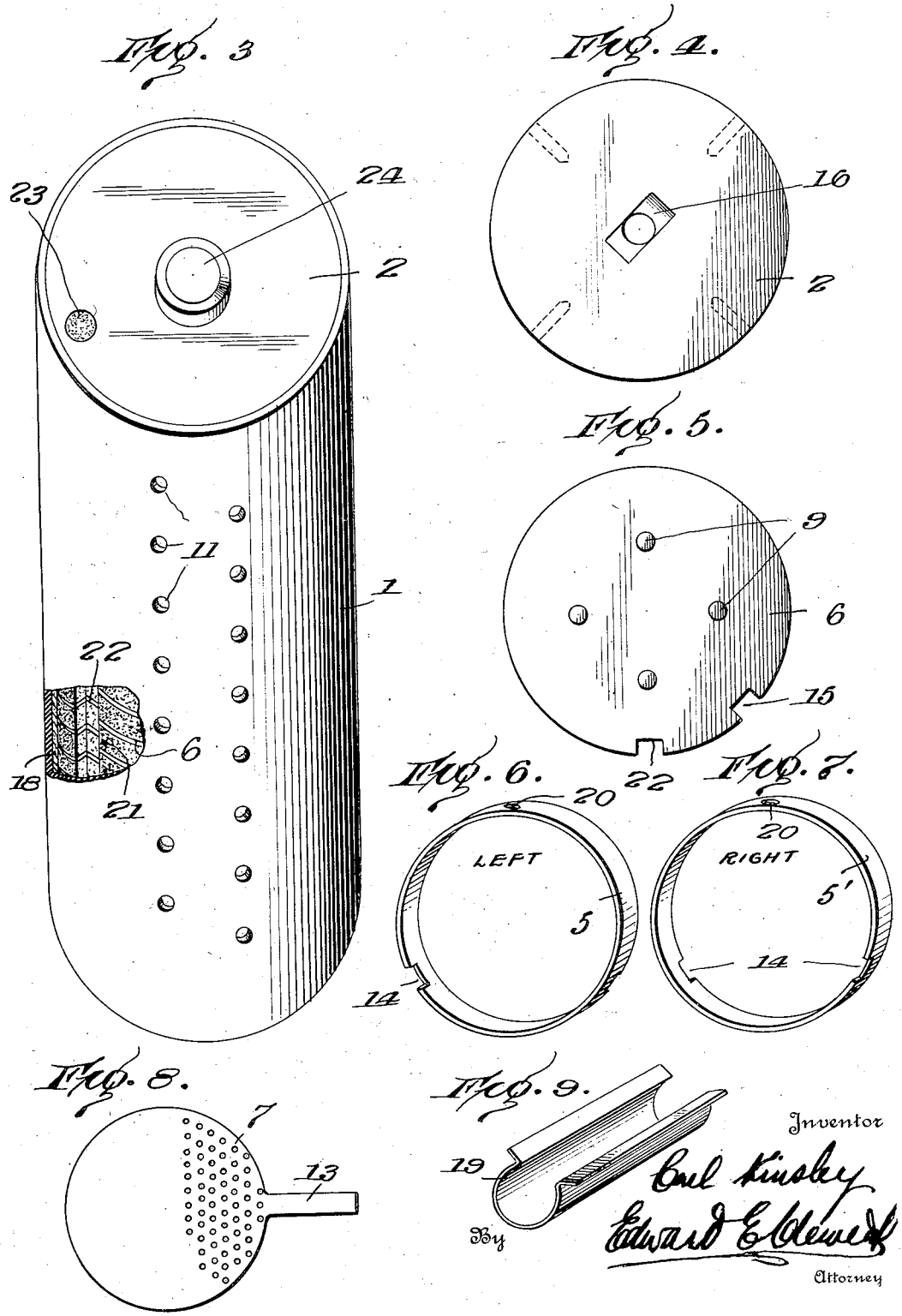

Patented Nov. 4, 1924.

1,513,913

UNITED STATES PATENT OFFICE.

CARL KINSLEY, OF WASHINGTON, DISTRICT OF COLUMBIA, ASSIGNOR TO ENGINEERS DEVELOPMENT COMPANY, OF WASHINGTON, DISTRICT OF COLUMBIA, A PARTNERSHIP COMPOSED OF FREDERICK E. PERNOT AND CARL KINSLEY.

STORAGE BATTERY.

Application filed September 18, 1920. Serial No. 411,097.

*To all whom it may concern:*

Be it known that I, CARL KINSLEY, a citizen of the United States, residing at Washington, in the District of Columbia, have invented certain new and useful Improvements in Storage Batteries, of which the following is a specification.

My invention relates to storage batteries, and has for its object the completion and improvement in certain points of technique or method, and structure, of solid unit multicell batteries made according to certain precedent inventions. The batteries referred to, as finally embodied within the present invention comprise a cylindrical assembly built up of circular lead plates in couples separated by insulating rings, enclosed within circular insulating sleeves, adjacent couples separated by notched insulating discs of greater diameter than said sleeves, terminals of adjacent positive and negative plates or cells being brought together and joined through the notches in the discs, and finally the whole assembly, with suitable end terminals, being encased or embedded in insulating compound and the mass so formed surrounded by an insulating cylinder.

My invention has to do with the following points:

1st, the method of and means for supplying moisture to the cells after assembly;

2nd, the method of and means for applying the binding and insulating material to form a unit mass; and 3rd, the method of filling the interstitial spaces and the improvement in structure so produced.

Briefly stated, I attain my object of improvement in regard to these points as follows:

1st, I provide each cell sleeve during manufacture with a projecting plug, and after assembly the plugs are withdrawn, leaving openings through the insulating embedment and cell sleeves, through which water and the electrolyte can be introduced directly into the cells.

2nd, I provide a mould or trough of heat resistant material having an internal cylindrical figure to receive the assembled elements and insulators, closing the ends of the trough by the heads of the completed unit battery, then fill the trough while heating it, with bituminous battery compound, which causes the same by natural flow to penetrate into all interstices and completely fill and embed all spaces and parts.

3rd, after the mass is unified in the mould or trough, it is removed after cooling, a channel cut along one side lengthwise, slipped into a polished cylindrical hard rubber sleeve, and the melted paraffin or equivalent relatively low melting insulating compound is poured or forced through an opening in one head registering with said channel, so as to completely fill all interstices and solidify the mass within the rubber sleeve.

My invention is illustrated in the accompanying drawings in which:

Fig. 1 is a side view, twice the actual size, partly broken away and partly in section through the axis of the assembly battery;

Fig. 1ª is a fragmentary section showing the core plug in position;

Fig. 2 is an end view of Fig. 1;

Fig. 3 is a perspective view of the assembled battery about actual size;

Fig. 4 is a plan view of one of the end plates;

Fig. 5 is a plan view of one of the partition diaphragms;

Figs. 6 and 7 are perspective views of a left and right hand cell-ring, respectively;

Fig. 8 is a plan view of a battery plate or element; and

Fig. 9 is a perspective view of the molding trough on a small scale.

Referring to the drawings in detail, the battery when assembled comprises the cylindrical shell 1, closed at the ends by the end plates 2 and 3, enclosing a plurality of battery cells 4 formed by the cell rings 5 and discs 6.

Each cell 4 contains a pair of plates or elements 7 spaced apart by a separator ring 8 and spaced from the adjacent partitions by the spacing lugs 9. The entire group of cells 4 is surrounded and sealed by a filler 10 of bituminous material. For this material I employ at present a commercial compound known in the market as "battery compound." From each cell 4, a conical aperture 11 leads through the cell ring 5, filler 10 and casing wall 1 to the outside. Each cell 4 is filled with a colloidal or gelatinous substance 12 containing the electrolyte. I do not claim this substance as my invention.

The battery units are connected in series through the terminals 13 which pass from one cell to another through the notches 14 and 15 in the cell-rings 5 and partitions 6, respectively, the terminals 13 of the extreme end plates being soldered or otherwise suitably electrically connected to the end or battery terminals 24 and 25. These battery terminals 24 and 25 are secured in the end plates 2 and 3 against longitudinal or rotary displacement by means of the rectangular off-set openings 16 indicated in Figs. 1 and 4.

The end plates 2 and 3 are held in the casing 1, by pins 17 extending radially therethrough. A filler 18, such as paraffin, having a melting point lower than that of the filler 10, is inserted between the body of the filler 10 and the cylindrical casing 1, filling all interstices. Both the bituminous and the paraffin fillers are nonhydroscopic.

In making the battery, the cells and battery elements are assembled in the trough 19, shown in Fig. 9, with the end plates 2 and 3 in place and the battery elements connected in series between the terminals 24 and 25 as indicated in Fig. 1. The trough 19 is then heated and while hot filled with bituminous battery compound 10 between the end plates 2 and 3, the compound insinuating itself into all the interstices between the walls of the trough and the assemblage of cells, suitable plugs of heat conducting material having been first inserted in the filling openings 20 in the cell-rings 5 and 5' as cores to form that portion of the conical openings 11 which passes through the body of the filler 10.

After the mass of battery compound has solidified, the whole assemblage is removed, the plugs taken out, and a channel or groove is cut lengthwise along one side as indicated at 21 in Figs. 2 and 3, the notches 22 in the partition diaphragms 6 having been lined up in assembling in the trough to allow the groove to be cut through in register with them, or the diaphragms 6 may be formed without the notches 22 and the groove 21 cut in the assemblage of diaphragms and the body of the molded battery compound.

The molded unit is now slipped into the cylindrical casing 1 of hard rubber polished inside and out, and melted paraffin or other non-hydroscopic material 18 of low melting point with respect to the bituminous compound is poured or forced through an opening 23 in one of the end plates registering with the channel 21 so as to completely fill all interstices and solidly hold the molded unit within the rubber sleeve.

The right and left hand cell-rings are alike in all respects except that the notches 14 are oppositely arranged in the different rings, that is, in the left hand rings, Fig. 6, the near notch is to the left and the far notch is to the right, and vice versa for the right hand rings, Fig. 7. By thus forming the cell-rings and using alternate right and left hand rings in the battery assemblage, the connections 13 between the cells can be staggered as indicated in Figs. 1 and 2.

During the pouring of the material 18, the plugs or cores, which are preferably made of zinc each with a small hole or channel 11$^a$ through it from end to end to permit the escape of gases, are re-inserted through the casing 1 into the holes 20 of the cell rings to preserve the continuity of the charging channels 11.

The solid parts of the battery being thus completed, the plugs or cores are removed from the channels 11. This is done in every case by means of a heated tool such as hot pliers. The battery cells are then filled through the openings 11 with a colloidal or gelatinous substance containing a suitable electrolyte. These openings 11 also serve as means for supplying moisture to the cells after assembly.

I claim as part of my invention the method and means for forming the openings into the several cells, but not the openings as such. I do not claim either the mechanical structure of the cell units as such, or the primary filling or embedment of bituminous compound, but I do claim the use of a lower melting supplemental filling, as paraffin.

What I claim is:

1. The method of producing a storage battery of the type described which consists in assembling a plurality of cell units each of which has a filling opening, fixing plugs in the filling openings, flowing insulating compound around the cell units and around the plugs, and finally withdrawing the plugs.

2. The method described in claim 1 with the additional step of heating the plug while withdrawing it.

3. The method of constructing a storage battery of the type described consisting of assembling the unit parts within a mould, heating the mould, and filling the mould while heated with bituminous insulating compound, until all parts are embedded and all interstices filled in one solid continuous mass forming a self sustained unit.

4. The method described in claim 3 with the additional step of forming openings into the several unit cells, plugging the openings, proceeding as in claim 5, and after cooling removing the plugs with a heated tool.

5. The method of rendering a storage battery of the type described completely non-hydroscopic which consists in embedding the assembled cells and terminals in insulating compound having a relatively high melting point, completing the assembly of the finished battery, and finally filling all interstitial spaces with an insulating compound having a relatively lower melting point.

6. The method of claim 5 employing a bituminous compound for the high boiling insulator and paraffin for the low boiling ingredient.

7. The method claimed in claim 1 using plugs provided with channels for the escape of gas during sealing.

In testimony whereof I affix my signature.

CARL KINSLEY.